Dec. 24, 1929.  H. E. DUNN  1,740,539
ICE CREAM DISPENSING CONTAINER
Filed Jan. 17, 1928
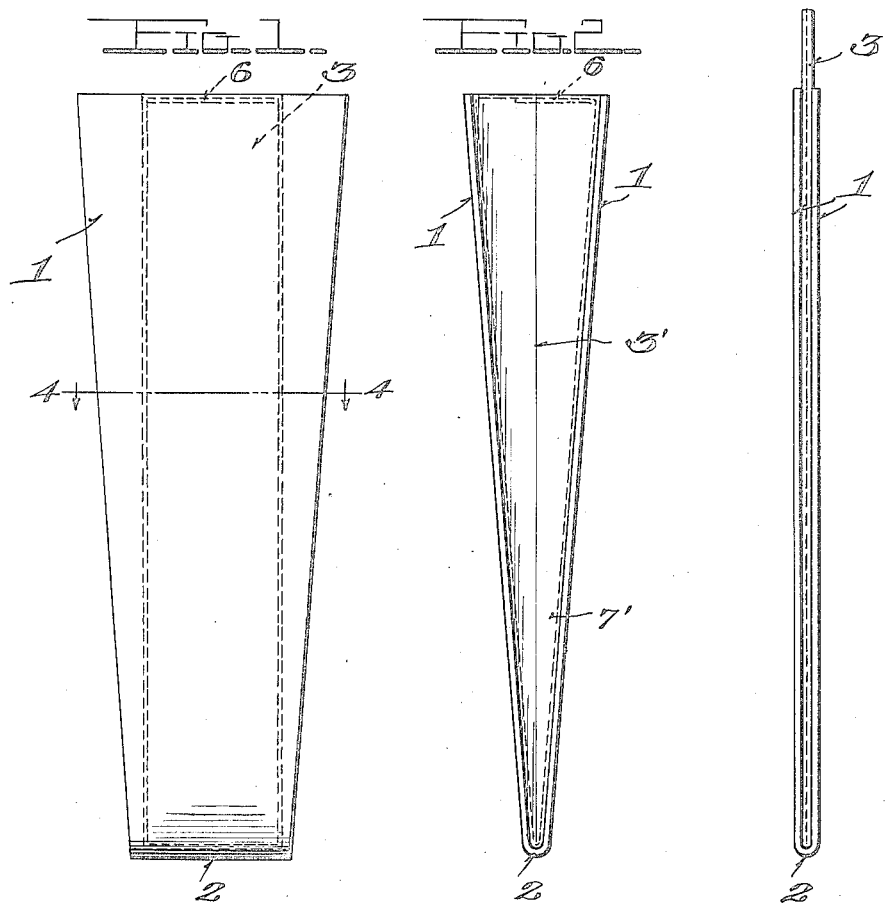
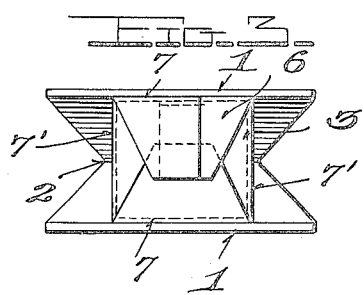
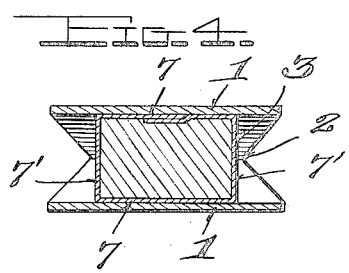
Inventor
Harold E. Dunn
By A. W. Freeman
Attorney Patented Dec. 24, 1929

1,740,539

UNITED STATES PATENT OFFICE

HAROLD E. DUNN, OF SIOUX FALLS, SOUTH DAKOTA

ICE-CREAM-DISPENSING CONTAINER

Application filed January 17, 1928. Serial No. 247,410.

This invention relates to ice cream dispensing containers, and the primary object thereof is to provide a dispenser which can be cheaply produced, which is effective in operation, and which can be easily held in, and operated by, one hand of the consumer.

A further object of the invention is to provide a device of this type in which ordinary glue may be used to secure the parts together, thereby to enable the dispenser to be economically and wholly made of paper or like material.

In the drawings:—

Fig. 1 is a front elevation of the invention;
Fig. 2 is a side elevation;
Fig. 3 is a top plan view;
Fig. 4 is a section on line 4—4 of Fig. 1, and
Fig. 5 is a side elevation of the invention in collapsed position.

In proceeding in accordance with the present invention, a pair of finger engaging members 1 are employed which latter are of rectangular form and may be formed of a single piece of relatively stiff cardboard or like fibrous or pulp material, that is bent intermediate its length at 2 so as to form a closed bottom. The members 1, 1, are disposed in diverging relation as depicted in Fig. 2 of the drawings, and are connected by a substantially pyramidal collapsible holder member 3. The sides of the pressure members 1 extend outwardly beyond the sides 7' of the member 3, thereby to exert greater and more uniform pressure on the ice cream, and to facilitate and assure of its complete extrusion. The holder member 3 acts to connect the members 1 and is formed of thin or flexible material such as paper, which latter is capable of being easily folded or pleated so as to assume an accordion or bellows-like form upon collapsing of the holder. The opposite sides of the member 3 are preferably glued to the confronting faces of the pressure members 1, while the remaining sides 7' which bridge the space between and connect the members 1 preferably have a line of fold 3' extending longitudinally thereof. The ice cream is in the form of a brick or block, which is conformably received in the holder. As depicted in Figs. 1 and 2, the member 3 projects above the upper ends of the members 1 and upon folding thereof as shown in Fig. 3 at 6, provides a cover for the ice cream brick or block.

In operation the members 1 are held in the hand of the user and by exerting pressure thereon, to cause same to approach, it will be seen that the ice cream will be extruded or dispensed through the open top of the holder. The members 1 are sufficiently rigid to apply an equalized pressure on the cream, as distinguished from tubes which are formed of yielding material in which latter equalized pressure cannot be had. In other words, in the present case, the members 1 move uniformly and enable the cream to be easily and quickly extruded. It will further be noted that the top of the device is normally closed and the ice cream protected, until being consumed, by the folded top 6 of the member 3, so that in use it is merely necessary to unfold the top 6, whereupon the cream may be extruded by pressure applied to the members 1, as above set forth.

What is claimed is:—

An ice cream dispensing container composed of a pair of opposed pressure members having their lower ends connected and their upper ends free, and an ice cream holder composed of a tubular paper or the like member secured to and between said members, the upper end of the member extending above the upper end of the pressure members and being foldable to overlie the ice cream and to provide a protecting cover for the ice cream until the latter is to be dispensed, said pressure members being formed of material of such rigidity so as to expel the ice cream upon pressure being exerted on the members to cause same to approach one another.

In testimony whereof I affix my signature.

HAROLD E. DUNN.